United States Patent
Gullick

(10) Patent No.: US 10,172,369 B2
(45) Date of Patent: Jan. 8, 2019

(54) FILM FOR EMBOSSING HOT PROCESSES FOOD ITEMS

(71) Applicant: Bemis Company, Inc., Neenah, WI (US)

(72) Inventor: George J. Gullick, Neenah, WI (US)

(73) Assignee: Bemis Company, Inc., Neenah, WI (US)

( * ) Notice: Subject to any disclaimer, the term of this patent is extended or adjusted under 35 U.S.C. 154(b) by 769 days.

(21) Appl. No.: 14/146,188

(22) Filed: Jan. 2, 2014

(65) Prior Publication Data

US 2015/0181904 A1 Jul. 2, 2015

(51) Int. Cl.
*A23C 19/16* (2006.01)

(52) U.S. Cl.
CPC ..... *A23C 19/166* (2013.01); *Y10T 428/24413* (2015.01)

(58) Field of Classification Search
CPC .................. A23C 19/166; B32B 27/32; Y10T 428/24413
See application file for complete search history.

(56) References Cited

U.S. PATENT DOCUMENTS

| | | | | |
|---|---|---|---|---|
| 4,960,648 A | * | 10/1990 | Yamada | B32B 27/20 428/474.7 |
| 7,314,662 B2 | | 1/2008 | Lefebvre et al. | |
| 2003/0049475 A1 | * | 3/2003 | Su | B32B 27/18 428/515 |
| 2008/0311261 A1 | | 12/2008 | Gullick | |

* cited by examiner

*Primary Examiner* — Yan Lan
(74) *Attorney, Agent, or Firm* — Amy L. De Coster

(57) ABSTRACT

The present invention relates to thermoplastic cheese packaging films having an outer sealant layer having a three-dimensional food-contact surface topography formed by a roughening agent dispersed within the polymer matrix of the sealant layer. When the hot processed cheese contacts the surface of the sealant layer and cools, the cheese is embossed by inverse replication of the surface topography of the sealant layer. Such films are particularly useful when used with high speed hot packaging operations.

12 Claims, 1 Drawing Sheet

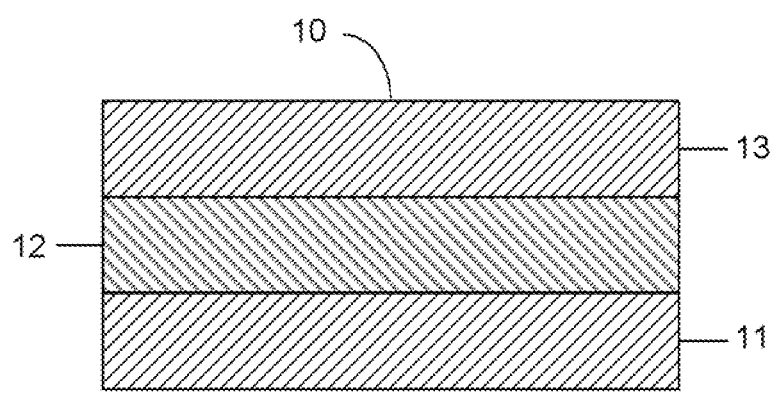

FILM FOR EMBOSSING HOT PROCESSES FOOD ITEMS

FIELD OF THE INVENTION

The present invention relates to packaging materials for food items, and particularly to packaging materials which will emboss the surface of hot processed food items.

BACKGROUND OF THE INVENTION

Thermoplastic film, and in particular polyolefin materials, have been used for some time in connection with packaging of various articles including food products which require protection from the environment, an attractive appearance, and resistance to abuse during the storage and distribution cycle. Coextruded multilayer thermoplastic packaging has been used conventionally for a considerable number of years in food packaging, and especially in the packaging of cheese and processed cheese. For example, cheese manufacturers have utilized multilayer thermoplastic films to package processed cheese utilizing a "hot pack" method. In the hot pack packaging process, an extrusion nozzle discharges molten cheese into a packaging film tube. The film tube moves away from the nozzle at a steady rate to allow the film tube to fill with the cheese product. Sizing rolls flatten the longitudinally sealed film tube and the molten cheese product to a desired product thickness. To solidify the cheese, the cheese-filled film tube moves over cooling wheels or through a cold water bath that cools the cheese. To produce individual cheese slices, the cooled cheese tube is transversely cut and sealed. To produce a loaf-type cheese product, packaging material is first inserted into a forming mold to form a pouch and then passed to a filling station where hot melted cheese is poured into the pouch. As the cheese cools, it generally takes the form of the pouch inside the forming mold. A fin seal or lap seal closure is used for sealing of the pouch, to provide a packaged cheese product.

Because the packaging film surface that contacts the cheese is typically smooth, the cheese surface develops a glossy appearance which is generally perceived by consumers as having an undesirable "processed" look. To overcome this deficiency, cheese manufacturers have embossed the packaging film just prior to the packaging process. Embossing of the packaging film requires heating the film to its softening temperature and contacting the film onto an embossed surface, typically an embossing nip roller which produces an inverse three-dimensional replication of the embossed surface on the film. As the liquid cheese is pumped into the product cavity, it fills the depressions of the embossed surface of the film leaving a dull finish on the surface of the cheese product when the film is removed. However, as new high speed hot packaging equipment and processes come into use, it has become more difficult to obtain a desirable cheese appearance with conventional embossed packaging films and methods.

Therefore, there is the need for improved packaging films and methods.

SUMMARY OF THE INVENTION

It is therefore an object of this invention to provide a thermoplastic cheese packaging film capable of embossing the surface of a hot processed cheese item packaged therein, particularly when used with high speed hot packaging operations.

In one aspect, the present invention provides a thermoplastic cheese packaging film having an outer sealant layer having a three-dimensional food-contact surface topography formed by a roughening agent dispersed within the polymer matrix of the sealant layer. When the hot processed cheese contacts the surface of the sealant layer and cools, the cheese is embossed by inverse replication of the surface topography of the sealant layer. As the packaging film is removed from the cheese, the surface of the cheese remains embossed.

In another aspect, the present invention provides a method for embossing the surface of a hot processed food item by providing a thermoplastic film having a first side edge and a second side edge, wherein the film comprises a sealant layer having a three-dimensional food-contact surface topography comprising at least 5% by weight relative to the total weight of the sealant layer of a roughening agent having an average particle size of between 12 and 250 micron dispersed into a polymer matrix; forming a tubular member by folding the film onto itself such that the three-dimensional surface of the sealant layer is an inner surface of the tubular member: forming a longitudinal seal by heat sealing the first side edge to the second side edge; filling the tubular member with a hot processed food item, for example, cheese such that the item contacts the three-dimensional surface of the sealant layer; forming a first transverse end seal by heat sealing said inner surface of the tubular member together; forming an opposing second transverse end seal by heat sealing the inner surface of said tubular member together thereby forming a package; and individualizing the package by cutting the tubular member at a location adjacent to the first transverse end seal and at a location adjacent to the second transverse end seal.

BRIEF DESCRIPTION OF THE DRAWINGS

Further features and advantages of the present invention will become apparent from the following detailed description, taken in combination with the appended drawings, in which:

FIG. 1 depicts a cross-sectional view of one embodiment of the present invention.

DETAILED DESCRIPTION OF THE INVENTION

A cross-section view of a representative packaging film as described herein is shown in FIG. 1. This packaging film 10 comprises a 3-layer structure comprising an outer sealant layer 11, a core layer 12 and an outer skin layer 13. This structure can be formed by any known coextrusion technique including, but not limited to, blown film, cast, and flat die coextrusion methods. Film 10 may include additional layers as desired. Examples of suitable roughening agents include, but are not limited to, calcium salt such as calcium carbonate and calcium sulfate, sand, clay, silica, crosslinked polymers such as polyethylene, ultra-high molecular weight polyethylene (UHMWPE). The roughening agent must be capable of being dispersed within the polymer matrix of the sealant layer with little or no melting under film processing conditions.

Masterbatches of roughening agents can be used in the preparation of the compositions of the present invention. A masterbatch is a mixture of a roughening agent, a thermoplastic polymeric matrix and optionally one or more dispersing/compatibility additives. Suitable polymers for use as the polymeric matrix in a masterbatch may include, but are not limited to, polyolefins such as polyethylene including low density polyethylene, linear low density polyethylene, medium density polyethylene, and ethylene/α-olefin copolymer; ethylene/vinyl acetate copolymer, ionomers and the like.

The composition of a given masterbatch may vary depending on the roughening agent and its required amount in the masterbatch. For example, blends of polymers may be used to facilitate sufficient dispersion of the roughening agent in the masterbatch. In one preferred embodiment of the invention, the sealant layer comprises about 20% by weight relative to the total weight of the sealant layer of a masterbatch that includes about 70% by weight relative to the total weight of the masterbatch of a roughening agent having an average particle size of at least 12 micron dispersed in linear low density polyethylene. In another preferred embodiment, the sealant layer comprises about 20% by weight relative to the total weight of the sealant layer of a masterbatch that includes about 25% by weight relative to the total weight of the masterbatch of a roughening agent having an average particle size of between 125 and 250 micron in low density polyethylene.

In accordance with the present invention, the outer sealant layer 11 may include one or more polymeric materials. Suitable polymer materials include, but are not limited to, polyethylene such as low density polyethylene, medium density polyethylene, linear low density polyethylene, and ethylene α-olefin, ethylene/vinyl acetate copolymer and blends thereof. In a preferred embodiment, sealant layer 11 comprises a blend of low density polyethylene and ethylene/α-olefin copolymer, and more preferably, a blend of about 42% by weight relative to the total weight of the sealant layer of low density polyethylene and about 20% by weight relative to the total weight of the sealant layer of ethylene/α-olefin copolymer. In another preferred embodiment, sealant layer 11 comprises a blend of ethylene/vinyl acetate copolymer with a polyolefin.

Non-limiting examples of suitable low density polyethylene resins include Petrothene NA214000 (Equistar Chemicals, LP, Houston, Tex., USA), ExxonMobil's LD 135.09 and 206.48 grades of low density polyethylene resin (ExxonMobil Chemical Corporation, Houston, Tex., USA) and Dow™ LDPE 722 grade resin (The Dow Chemical Company, Midland, Mich., USA).

Non-limiting examples of suitable linear low density polyethylene include AFFINITY™ EG8150G polyolefin plastomer which is an ethylene α-olefin copolymer having an octene comonomer (Dow Chemical Company, Midland, Mich., USA) and EXACT™ 3131 plastomer which is an ethylene α-olefin copolymer having a hexane comonomer (ExxonMobil Chemical Corporation, Houston, Tex., USA).

Non-limiting examples of suitable ethylene/vinyl acetate copolymers include resins having a vinyl acetate content in the range of 9 to 18.5% such as DuPont ELVAX®3124, ELVAX®3130, and ELVAX®3170 grade resins (DuPont Chemical Company, Wilmington, Del., USA), ExxonMobil ESCORENE® LD 721.1K grade resins (ExxonMobil Chemical Corporation, Houston, Tex., USA) and Westlake ELEVATE™ EF522 resin (Westlake Chemical Company, Houston, Tex, USA).

In specific embodiments of the present invention, the multilayer films may optionally comprise additives such as release agents, pigments, polymer processing aids, slip and anti-blocking agents. Masterbatches of additives can be used in the preparation of the compositions of the present invention. For example, a cheese release agent masterbatch may contain between 0.5% and 3% by weight relative to the total of the sealant layer of a cheese release agent. An example of a commercially available cheese release agent includes glycerol mono-stearate (GMS) supplied in a masterbatch form from Ampacet Corporation.

In accordance with the present invention, the core layer 12 may include one or more polymeric materials. Suitable polymeric materials for use in the core layer include, but are not limited to polyolefins such as polypropylene, polyethylene and blends thereof. In one preferred embodiment, core layer 12 comprises a blend of about 95% by weight relative to the total weight of the core layer of polypropylene and about 5% by weight relative to the total weight of the core layer of low density polyethylene.

Non-limiting examples of suitable polypropylene include Braskem 0216 and Braskem 0218 grade resins (Braskem, São Paulo, SP Brasil).

In accordance with the present invention, the skin layer 13 may include one or more polymeric materials. Suitable polymeric materials for use in the core layer include, but are not limited to polyolefins such as polypropylene, polyethylene and blends thereof. In one preferred embodiment, skin layer 13 comprises 100% by weight relative to the total weight of the skin layer of polypropylene. In another preferred embodiment, skin layer 13 is free of any additives such as calcium carbonate and the like.

The total thickness of a representative, multilayer packaging film of the present invention, as described herein, is generally from about 15 μm (0.6 mil) to about 50 μm (2.0 mils), typically from about 20 μm (0.8 mils) to about 44 μm (1.75 mils), most typically from about 22 μm (0.9 mils) to about 35 μm (1.4 mils).

Various combinations of layers can be used in the formation of multilayer films according to the invention. The three-layer embodiments described herein are provided as illustrations and are not intended to limit the scope of the invention. The multilayer films of the invention can also comprise more layers. Thus, modifications and variations may be utilized without departing from the principles and scope of the invention, as those skilled in the art will readily understand.

The above description and the following examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

WORKING EXAMPLES

In all the following examples, all film structures were produced using a cast coextrusion apparatus and method which are well known to those skilled in the art. The cast coextrusion film apparatus includes a multi-manifold flat die head for film through which the film composition is forced and formed into a flat sheet. The sheet is immediately quenched e.g., via cooled water bath, solid surface and/or air, and then ultimately collapsed and formed into a film.

Specifically, the multilayer films of the present invention and comparative films had the following structures, from the inner (sealing or food contact) layer to the outer (skin or non-food contact) layer:

Example 1

Example 1 is one embodiment of a packaging film of the present invention having a structure and layer compositions as described below and as illustrated in FIG. 1. Reported below is the basis weight of the layer relative to the total film weight and the layer composition.

Layer 1 (Sealant): 22%; 42 wt.-% low density polyethylene (LDPE)-Petrothene NA214000 (Equistar Chemicals, LP, Houston, Tex., USA), 20 wt-% ethylene/α-olefin copolymer-AFFINITY™ EG8150G polyolefin plastomer (Dow Chemical Company, Midland, Mich., USA), 20 wt-% masterbatch of 70 wt.-% of calcium carbonate having an average particle size of at least 12 micron in linear low density polyethylene (LLDPE)-Ampacet 101952 (Ampacet Corporation, Tarrytown, N.Y., USA); and 18 wt.-% masterbatch of cheese release agent-Ampacet 100782-PA (Ampacet Corporation, Tarrytown, N.Y., USA).

Layer 2: 68%; 95 wt.-% polypropylene (PP)-Braskem D216 (Braskem, São Paulo, SP Brasil) and 5 wt.-% low density polyethylene (LDPE)-Petrothene NA214000 (Equistar Chemicals, LP, Houston, Tex., USA).

Layer 3: 10%; 100 wt.-% polypropylene (PP)-Braskem D216 Braskem, São Paulo, SP Brasil).

Example 2

Example 2 is one embodiment of a packaging film of the present invention having a structure and layer compositions as described below and as illustrated in FIG. 1. Reported below is the basis weight of the layer relative to the total film weight and the layer composition.

Layer 1 (Sealant): 22%; 42 wt.-% low density polyethylene (LDPE)-Petrothene NA214000 (Equistar Chemicals, LP, Houston, Tex., USA), 20 wt.-% ethylene/α-olefin copolymer-AFFINITY™ EG8150G polyolefin plastomer (Dow Chemical Company, Midland, Mich. USA), 20 wt-% masterbatch of 25 wt.-% of ultra-high molecular weight polyethylene (UHMWPE) having an average particle size of between 125 and 250 micron and a melt point greater than 500° C. (260° C.) in low density polyethylene (LDPE)-Ampacet 10820 (Ampacet Corporation, Tarrytown, N.Y., USA); and 18 wt-% masterbatch of cheese release agent-Ampacet 100782-PA (Ampacet Corporation, Tarrytown, N.Y. USA).

Layer 2: 68%; 95 wt.-% polypropylene (PP)-Braskem D216 (Braskem, São Paulo, SP Brasil) and 5 wt.-% low density polyethylene (LDPE)-Petrothene NA214000 (Equistar Chemicals, LP, Houston, Tex., USA).

Layer 3: 10%; 100 wt.-% polypropylene PP-Braskem D216 Braskem São Paulo, SP Brasil).

Comparative Example 1

Comparative Example 1 was prepared having a structure and layer compositions as described below and as illustrated in FIG. 1. Reported below is the basis weight of the layer relative to the total film weight and the layer composition.

Layer 1 (Sealant): 22%; 42 wt.-% low density polyethylene (LDPE)-Petrothene NA214000 (Equistar Chemicals, LP, Houston, Tex., USA), 20 wt.-% ethylene/α-olefin copolymer-AFFINITY™ EG8150G polyolefin plastomer (Dow Chemical Company, Midland, Mich. USA), 20 wt.-% masterbatch of 50 wt.-% of talc having an average particle size of between 5 and 6 micron in linear low density polyethylene (LLDPE)-Ampacet 100165-C (Ampacet Corporation, Tarrytown, N.Y., USA); and 18 wt.-% masterbatch of cheese release agent-Ampacet 100782-PA (Ampacet Corporation, Tarrytown, N.Y., USA).

Layer 2: 68%; 95 wt.-% polypropylene (PP)-Braskem D216 (Braskem, São Paulo, SP Brasil) and 5 wt.-% low density polyethylene (LDPE)-Petrothene NA214000 (Equistar Chemicals, LP, Houston, Tex., USA).

Layer 3: 10%; 100 wt.-% polypropylene PP)-Braskem D216 (Braskem, São Paulo, SP Brasil).

Comparative Example 2

Comparative Example 2 was prepared having a structure and layer compositions as described below and as illustrated in FIG. 1. Reported below is the basis weight of the layer relative to the total film weight and the layer composition.

Layer 1 (Sealant): 22%; 42 wt-% low density polyethylene (LDPE)-Petrothene NA214000 (Equistar Chemicals, LP, Houston, Tex., USA), 20 wt.-% ethylene/α-olefin copolymer-AFFINITY™ EG8150G polyolefin plastomer (Dow Chemical Company, Midland, Mich., USA), 20 wt-% masterbatch of 50 wt.-% of diatomaceous earth having an average particle size of between 5 and 6 micron in low density polyethylene (LDPE)-Ampacet 101736 (Ampacet Corporation, Tarrytown, N.Y., USA); and 18 wt.-% masterbatch of cheese release agent-Ampacet 100782-PA (Ampacet Corporation, Tarrytown, N.Y., USA).

Layer 2: 8%; 95 wt.-% polypropylene (PP)-Braskem D216 (Braskem, São Paulo, SP Brasil) and 5 wt.-% low density polyethylene (LDPE)-Petrothene NA214000 (Equistar Chemicals, LP, Houston, Tex., USA).

Layer 3: 10%; 100 wt.-% polypropylene (PP)-Braskern D216 (Braskem, São Paulo, SP Brasil).

Various experiments were performed in order to investigate the effects of several variable on the characteristics of the resulting packaging films described herein. For example, the relationship between the amount of added roughening agent in the sealant layer and the surface appearance of the cheese product, and the average particle size of the roughening agent in the sealant layer and the surface appearance of the cheese product. With both comparative films, no noticeable effect was observed on the surface appearance of a packaged cheese product. Favorable results; in terms of a desirable matte or embossed surface appearance of the packaged cheese were achieved using at least 5% by weight relative to the total weight of the sealant layer of a roughening agent having an average particle size of at least 12 micron. The most favorable results were achieved using at least 5% by weight relative to the total weight of the sealant layer of a roughening agent having an average particle size in the range of 125 to 250 micron.

What is claimed:

1. A packaged hot processed food item comprising:
   a hot processed food item comprising cheese; and
   a package comprising a sealant layer comprising a roughening agent;
   wherein the sealant layer comprises the roughening agent in an amount of from 5% to 14% by weight of the sealant layer, wherein the roughening agent has an average particle size of from 12 microns to 250 microns, wherein the roughening agent is dispersed into a polymer matrix of the sealant layer forming a three dimensional food-contact surface topography, and wherein the sealant layer is adapted to emboss the cheese by inverse replication of the surface topography.

2. The packaged hot processed food item of claim 1, wherein the roughening agent comprises calcium carbonate, calcium sulfate, clay, diatomaceous earth, talc or combinations thereof.

3. The packaged hot processed food item of claim 1, wherein the polymer matrix comprises polyethylene, ethylene/vinyl acetate copolymer or blends thereof.

4. The packaged hot processed food item of claim 3, wherein the polyethylene comprises low density polyethylene, ethylene/α-olefin copolymer or blends thereof.

5. The packaged hot processed food item of claim 3, wherein the polymer matrix is a blend of low density polyethylene and ethylene/α-olefin copolymer.

6. The packaged hot processed food item of claim 5, wherein the polymer matrix is a blend of about 42% by weight relative to the total weight of the sealant layer of low density polyethylene and about 20% by weight relative to the total weight of the sealant layer of ethylene/α-olefin copolymer.

7. The packaged hot processed food item of claim 1, further comprising a core layer in contact with the sealant layer comprising polyethylene or polypropylene.

8. The packaged hot processed food item of claim 7, wherein the polyethylene comprises low density polyethylene, medium density polyethylene, high density polyethylene or blends thereof.

9. The packaged hot processed food item of claim 7, wherein the core layer comprises polypropylene.

10. The packaged hot processed food item of claim 7, further comprising a skin layer in contact with the core layer comprising a polyolefin.

11. The packaged hot processed food item of claim 10, wherein the polyolefin comprises polyethylene or polypropylene.

12. The packaged hot processed food item of claim 1, wherein the thermoplastic, coextruded, multilayer film has a total thickness from 15 μm (0.6 mil) to 50 μm (2.0 mils).

* * * * *